United States Patent
Adami et al.

(10) Patent No.: US 11,260,617 B2
(45) Date of Patent: Mar. 1, 2022

(54) HOT PLATE FOR DOUBLE FACER FOR THE PRODUCTION OF CORRUGATED BOARD AND DOUBLE FACER COMPRISING A PLURALITY OF SAID PLATES

(71) Applicant: Guangdong Fosber Intelligent Equipment Co., Ltd., Foshan (CN)

(72) Inventors: Mauro Adami, Viareggio (IT); Marco Imposti, Capannori (IT)

(73) Assignee: Guangdong Fosber Intelligent Equipment Co., Ltd., Guangdong Province (CN)

( * ) Notice: Subject to any disclaimer, the term of this patent is extended or adjusted under 35 U.S.C. 154(b) by 221 days.

(21) Appl. No.: 16/817,792

(22) Filed: Mar. 13, 2020

(65) Prior Publication Data
US 2020/0361173 A1    Nov. 19, 2020

(30) Foreign Application Priority Data

May 13, 2019  (IT) .......................... 102019000006752
Mar. 11, 2020  (EP) ..................................... 20162377

(51) Int. Cl.
*B31F 1/28*  (2006.01)
*B29C 35/06*  (2006.01)

(52) U.S. Cl.
CPC .............. *B31F 1/285* (2013.01); *B29C 35/06* (2013.01); *B31F 1/2881* (2013.01)

(58) Field of Classification Search
CPC ................................ B31F 1/2281; B29C 35/06
USPC ...................................................... 156/583.1
See application file for complete search history.

(56) References Cited

U.S. PATENT DOCUMENTS

| | | | |
|---|---|---|---|
| 4,023,481 A | * | 5/1977 | Keeny ..................... D21F 5/004 100/319 |
| 5,501,762 A | | 3/1996 | Marschke et al. |
| 5,785,118 A | | 7/1998 | Nagel et al. |
| 8,714,223 B2 | | 5/2014 | Adami et al. |
| 2011/0209862 A1 | | 9/2011 | Itoyama et al. |
| 2012/0193026 A1 | | 8/2012 | Adami et al. |
| 2019/0105866 A1 | | 4/2019 | Adami |

FOREIGN PATENT DOCUMENTS

| | | |
|---|---|---|
| EP | 0707946 A2 | 4/1996 |
| EP | 0768170 A1 | 4/1997 |
| EP | 0774342 A1 | 5/1997 |
| EP | 1362690 A1 | 11/2003 |
| EP | 1491326 A1 | 12/2004 |
| EP | 2484516 A1 | 8/2012 |

* cited by examiner

*Primary Examiner* — Barbara J Musser
(74) *Attorney, Agent, or Firm* — Breiner & Breiner, L.L.C.

(57) ABSTRACT

The hot plate (11) includes an upper plate (61) joined to a lower plate (63) along respective sides parallel to each other. A heat transfer fluid circulation chamber (65) is defined between the upper plate (61) and the lower plate (63), with at least a first inlet (83) of the heat transfer fluid and at least a first outlet (87) of the heat transfer fluid. The lower plate (63) has two downwardly bent edges (63.2), extending along the sides of the upper plate joined to the lower plate. Stiffening ribs (79) are joined to the lower plate (63), along the heat transfer fluid circulation chamber, and to the downwardly folded edges (63.2s) of the lower plate (63).

19 Claims, 7 Drawing Sheets

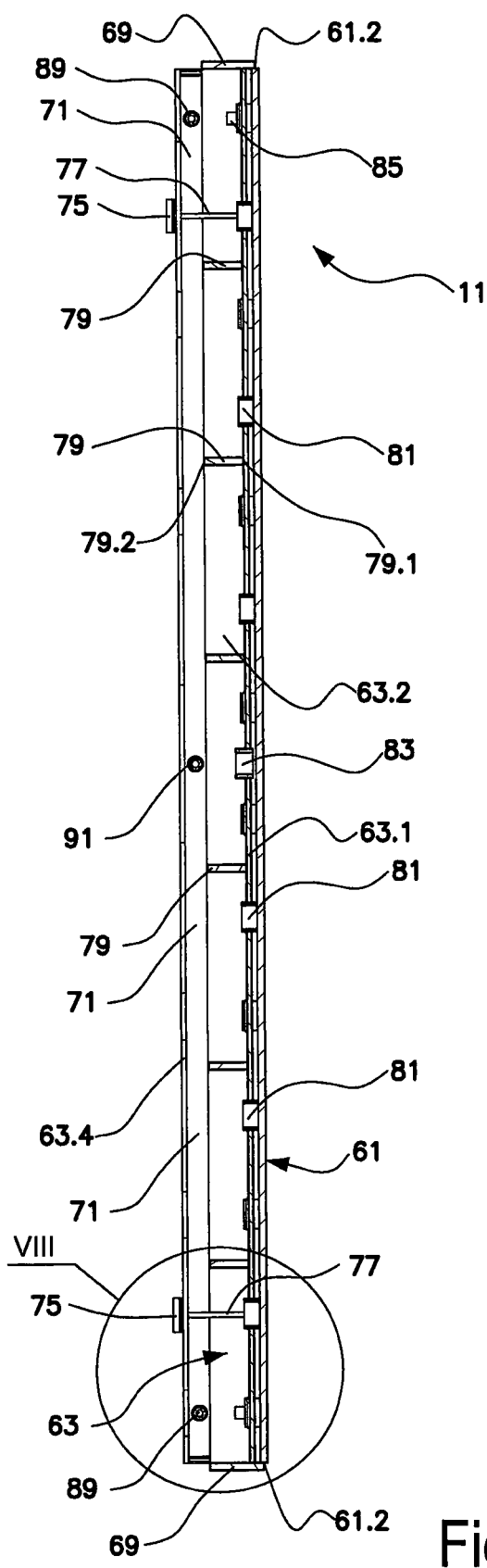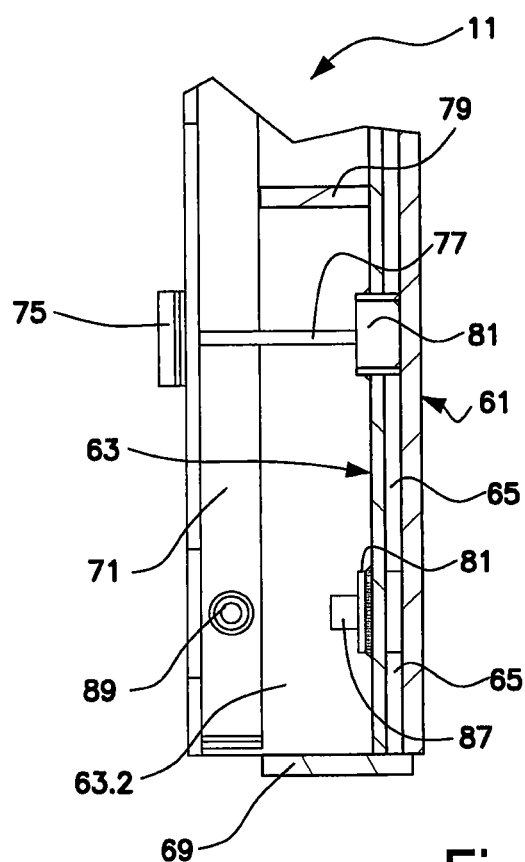
Fig.7
Fig.8

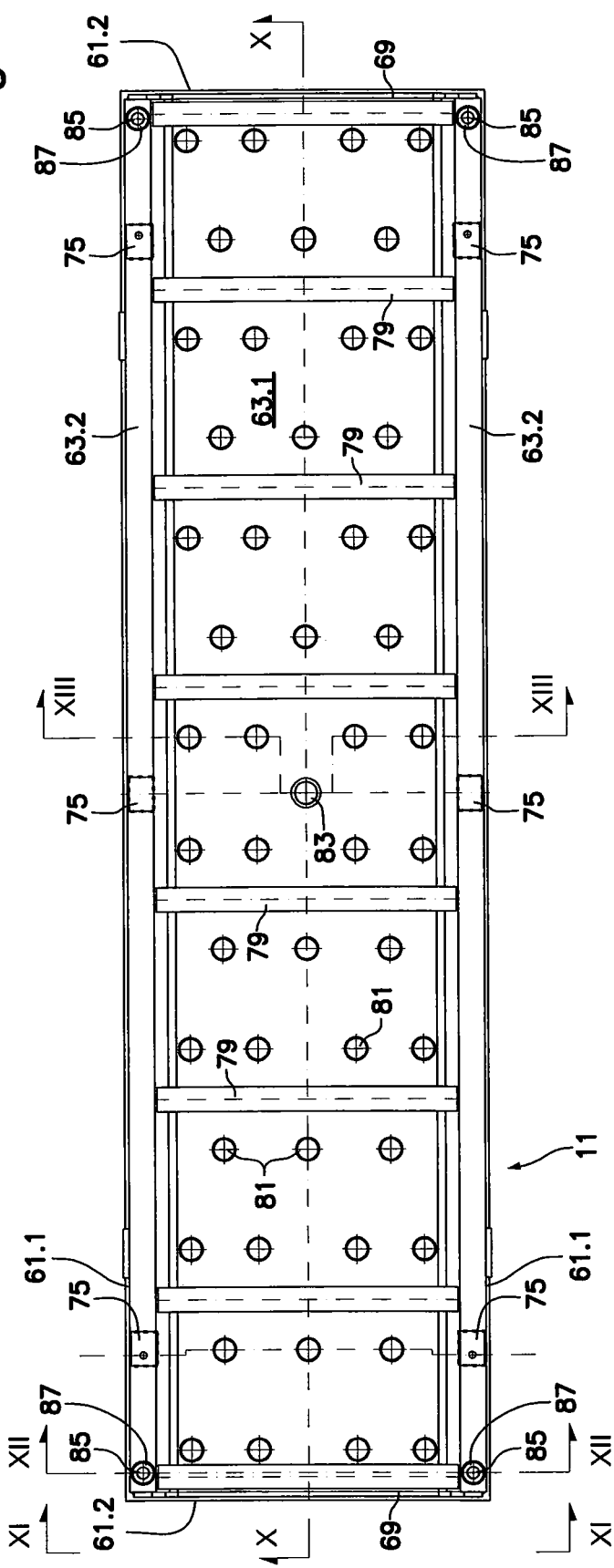

HOT PLATE FOR DOUBLE FACER FOR THE PRODUCTION OF CORRUGATED BOARD AND DOUBLE FACER COMPRISING A PLURALITY OF SAID PLATES

TECHNICAL FILED

The present invention relates to systems for the production of corrugated board and to the related methods. More particularly, the invention relates to improvements to the so-called double facer for the production of corrugated board and to the methods for the control thereof.

BACKGROUND ART

Corrugated board is produced continuously by bonding two or more sheets of paper unwound from respective reels. In general, a sheet of corrugated board comprises at least one corrugated paper sheet glued between two smooth paper sheets, also called liners. The corrugated board production lines comprise a plurality of unwinding stations which feed the paper sheets to the machines of the line. Two smooth paper sheets coming from two reels are fed to a so-called corrugator, which deforms one of the two paper sheets to make a plurality of flutes therein and bonds by gluing a second smooth paper sheet to the first corrugated paper sheet, thus obtaining a single face corrugated board. Examples of corrugators are described in EP1362690; US20120193026; U.S. Pat. No. 8,714,223; and US20190105866.

The single face corrugated board is fed to a so-called double facer, together with at least a third smooth paper sheet, which is glued to the single face corrugated board. In some cases, several sheets of single face corrugated board are fed in parallel and together with an additional smooth paper sheet, to form a multiple corrugated board, with two smooth outer liners and a plurality of sheets of corrugated paper and at least one sheet of smooth paper intermediate between said two liners. Examples of double facers are disclosed in US20120193026; EP2484516; EP1491326.

In general, a double facer includes a heating section comprising a series of hot plates arranged in sequence along a path for the advancement of a continuous strip of corrugated board. The hot plates are usually heated by means of a heat transfer fluid, for example pressurized steam. A cold traction section is arranged downstream of the heating section. The path of the corrugated board extends through the heating section and the cold traction section, the corrugated board advancing first through the heating section upstream and then through the cold traction section downstream.

The double facer further comprises traction members, which drag the corrugated board along the hot plates, and pressure members which press the corrugated board against the hot plates. The pressure members ensure that the corrugated board is kept in close sliding contact with the upper surface of the hot plates to facilitate mutual gluing of the sheets that make up the corrugated board, by means of pressure and heat supplied by the hot plates.

The hot plates are made of thermally conductive material and are usually hollow to allow the circulation of the heat transfer fluid. Traditional hot plates are made of cast iron, to provide efficient heat exchange and high resistance to internal pressure. The cast iron hot plates are designed so as not to undergo thermal deformations that could alter the shape of the substantially flat upper surface of the plates, along which the corrugated board slides. Although the use of cast iron hot plates has significant advantages in terms of heat exchange and dimensional stability, the cast iron hot plates have a high thermal inertia.

Thermal inertia represents a drawback, as it does not allow a rapid adaptation of the temperature of the hot plates to the operating conditions of the corrugated board production line. Indeed, a rather long time is required to reach the desired operating temperature. In some cases, it is necessary to reduce the temperature of the hot plates, for example if the feeding speed of the corrugated board is reduced.

The thermal inertia of the cast iron hot plates is an obstacle to a rapid adaptation of the temperature of the hot plates. In the event the operating temperature has to be reduced, it is often necessary to discharge high temperature steam from the heating circuit, to obtain a timely lowering of the temperature of the hot plates. The discharge of steam involves a great loss of energy and consequent drawbacks from the point of view of the management cost of the production line and an increase in the environmental impact of this type of plant.

Attempts have been made to make hot plates with lower thermal inertia. This requirement, however, clashes with the need to have hot plates which do not deform due to the effect of thermal expansion, since it is necessary that the contact and sliding surface of the board on the hot plates be as planar as possible.

EP0707946 discloses a hot plate which should have a lower thermal inertia than traditional cast iron hot plates. This known hot plate comprises a very thick metal upper plate, the upper face whereof forms the contact and sliding surface for the corrugated board. A corrugated metal sheet, which forms channels for the circulation of steam, is welded to the lower face of the plate. A layer of thermally insulating material is placed under the assembly formed by the plate and the metal sheet welded thereto. The assembly of upper plate and corrugated metal sheet is welded to uprights, which are in turn rigidly connected to a large-mass load-bearing structure. The uprights and the load-bearing structure must provide the necessary rigidity to the assembly formed by the plate and the corrugated metal sheet, to avoid thermal deformations of the contact and sliding surface of the corrugated board.

The structure of this hot plate is complex, also due to the need for massive uprights and load-bearing structure. Furthermore, the thermal inertia is still high. The performance of a double facer made with this type of hot plate is not satisfactory.

EP0774342 discloses a hot plate formed by two thin metal sheets which are coupled together. The thickness of the metal sheets is so small that a complex underlying stiffening structure is needed, with beams and tie-rods that block the metal sheets and prevent or limit the thermal deformation thereof. Despite the use of these measures, the hot plates of this type proved too subject to deformations of the sliding surface of the board and had no practical use.

EP0768170 discloses a hot plate formed by two thick plates between which parallel channels are formed for the circulation of steam. This plate has a high thermal inertia.

US2011/0209862 discloses a very thick hot plate, which has through holes for the circulation of steam. The mass of the hot plate is considerable and therefore it still has a relatively high thermal inertia. The holes in the plate are expensive to make.

There is therefore a need for hot plates for a double facer of plants for the production of corrugated board, which overcome or alleviate one or more of the drawbacks of the hot plates of the prior art.

SUMMARY OF THE INVENTION

According to embodiments disclosed herein, a hot plate for double facer of a corrugated board production line is provided, comprising an upper plate joined to a lower plate. A heat transfer fluid circulation chamber, typically steam, is delimited between the upper plate and the lower plate, with at least one inlet of the heat transfer fluid and at least one outlet of the heat transfer fluid. The upper plate has an approximately rectangular extension, with a smaller side and a larger side which, in use, is preferably oriented transversely with respect to the feeding direction of the corrugated board along the double facer. The upper plate is joined to the lower plate along two parallel sides, preferably along the longer sides. The junction can be by welding, or by gluing or in any other manner suitable for guaranteeing a seal to the heat transfer fluid circulating in the circulation chamber between the upper plate and the lower plate. Along the two sides joined to the upper plate, the lower plate has two downwardly bent edges. Furthermore, stiffening ribs are provided joined to the lower plate, along the portion thereof parallel to the upper plate, that is, along a substantially flat area or portion of the lower plate. The ribs are also joined to the downwardly bent edges of the lower plate. The ribs may be joined to the central flat area of the lower plate and to the bent edges thereof by welding or in another suitable manner, for example by gluing.

In the description and in the appended claims, the terms "upper", "lower", "high" and "low" are to be understood as referring to the position taken by the hot plate when it is assembled in the corrugated board production line. Therefore, the upper plate is that which, in the assembled position, is located above the lower plate and defines with the upper outer surface thereof the sliding surface of the corrugated board along the double facer.

In advantageous embodiments, the upper plate and the lower plate are joined together not only along the two parallel sides, preferably the longer sides, but also at intermediate points internal to the extension of the upper plate by means of reciprocal anchoring tie-rods, designed to provide a tensile force approximately orthogonal to the upper and lower plate and therefore approximately orthogonal to the sliding surface of the corrugated board.

The reinforcing and stiffening ribs guarantee dimensional stability of the plates and in particular contribute to maintaining a substantially flat shape of the outer surface of the upper plate when corrugated board slides over it. The effect of the ribs is both static, in that they provide a stiffening which opposes the thermally induced deformation, and thermal, since through the ribs underlying the lower plate, a temperature profile of the hot plate is obtained such as to reduce or substantially eliminate the thermally induced deformations which, with the double facer in use, would tend to deform the sliding surface of the corrugated board with respect to the flat or substantially flat shape. By "substantially flat" it is meant a surface whose planarity error is sufficiently limited to be negligible in terms of quality of the corrugated board obtained.

Advantageously, each downwardly bent edge of the lower plate is associated with an arrangement adapted to maintain the downwardly bent edge hot. In some embodiments, this arrangement may comprise a respective heating duct placed in heat exchange relationship with the respective downwardly bent edge. The two heating ducts are substantially parallel to the sides of the upper plate, along which the upper plate is joined to the lower plate. The heating ducts are preferably connected to the circulation chamber of the heat transfer fluid so as to collect heat transfer fluid, which has already yielded heat to the upper plate and, through it, to the corrugated board. In this way, the heating ducts represent a portion of the heating circuit at a temperature lower than the temperature of the circulation chamber of the heat transfer fluid defined between the upper plate and the lower plate of the hot plate. This is advantageous in terms of control and reduction of the thermally induced deformations in the upper plate when the hot plate is in operating conditions, i.e. in contact with the corrugated board which slides over it, removing heat from the hot plate.

Advantageously, each heating duct is in thermal contact with a respective longitudinal end edge of the respective downwardly bent edge of the lower plate. Each longitudinal end edge is preferably curved to at least partially envelop the heating duct.

The reinforcing or stiffening ribs are advantageously joined, for example by welding, along their end edges to the opposite downwardly bent edges of the lower plate, and have a height (i.e. a dimension in a direction orthogonal to the main surfaces of the upper plate and of the lower plate, and therefore with respect to the substantially flat sliding surface of the corrugated board) such as not to be in contact with the heating ducts, to avoid excessive heating of the ribs.

In other embodiments, the arrangement adapted to maintain the downwardly bent edges of the lower plate hot may comprise channels for collecting exhausted heat transfer fluid, for example steam condensate. In particular, in some embodiments disclosed herein, each of the two downwardly bent edges of the lower plate forms a channel for collecting the exhausted heat transfer fluid, for example in the form of condensed steam. Each channel may have a V-shaped cross section, with the, preferably rounded, vertex thereof placed at the end of the channel furthest from the lower plate. Each channel has at least one discharge port for the exhausted heat transfer fluid, for example condensate. Preferably, each channel has two discharge ports, one at each end of the channel.

According to a further aspect, a double facer for the production of corrugated board is disclosed herein comprising: a heating section with a series of hot plates as described above, arranged in sequence along a feeding path of a continuous corrugated board tape; and traction members for towing the corrugated board sliding along the hot plates. The hot plates are made as described above.

Further advantageous features and embodiments of the hot plates and of the double facer made therewith are described hereafter with reference to the accompanying drawings and are defined in the appended claims, which form an integral part of the present description.

BRIEF DESCRIPTION OF THE DRAWINGS

The invention will be better understood by following the description and the accompanying drawings, which illustrate exemplary and non-limiting embodiments of the invention. More particularly, the drawings show:

FIG. 7 a longitudinal section according to line VII-VII of FIG. 2;

FIG. 8 an enlargement of the portion VIII of FIG. 7;

FIG. 9 a bottom view of a hot plate of the double facer of FIG. 1 in a second embodiment;

FIG. 10 a section according to line XX of FIG. 9;

DETAILED DESCRIPTION

Figure 1:
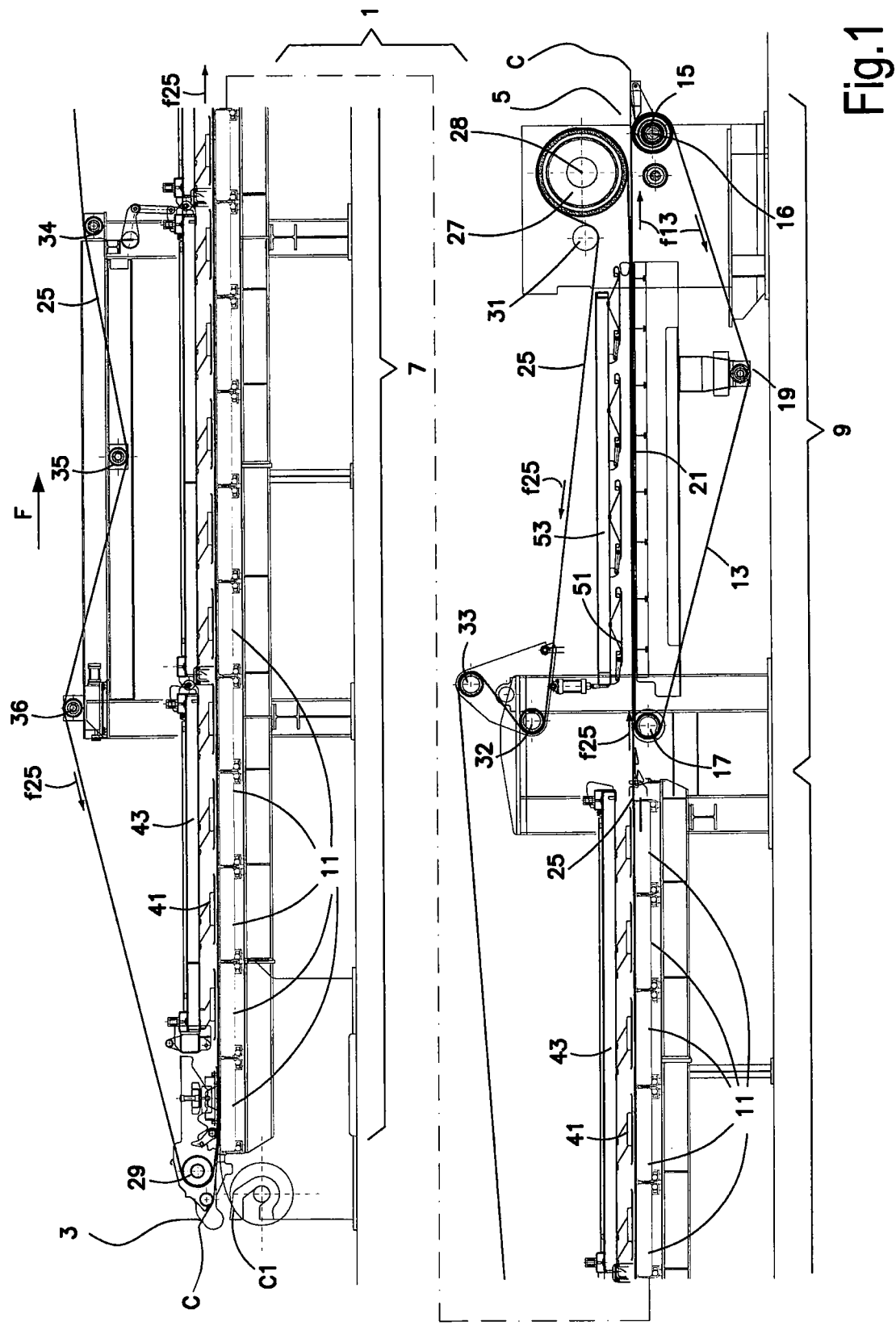
FIG. 1 the section of a corrugated board production line comprising the double facer.

FIG. 1 shows a diagram of a portion of a corrugated board production line, in which the double facer, indicated as a whole with reference numeral 1, is arranged. The structure of the double facer is known per se and therefore only the main components thereof useful for understanding the invention will be referred to in the present description.

Figure 2:
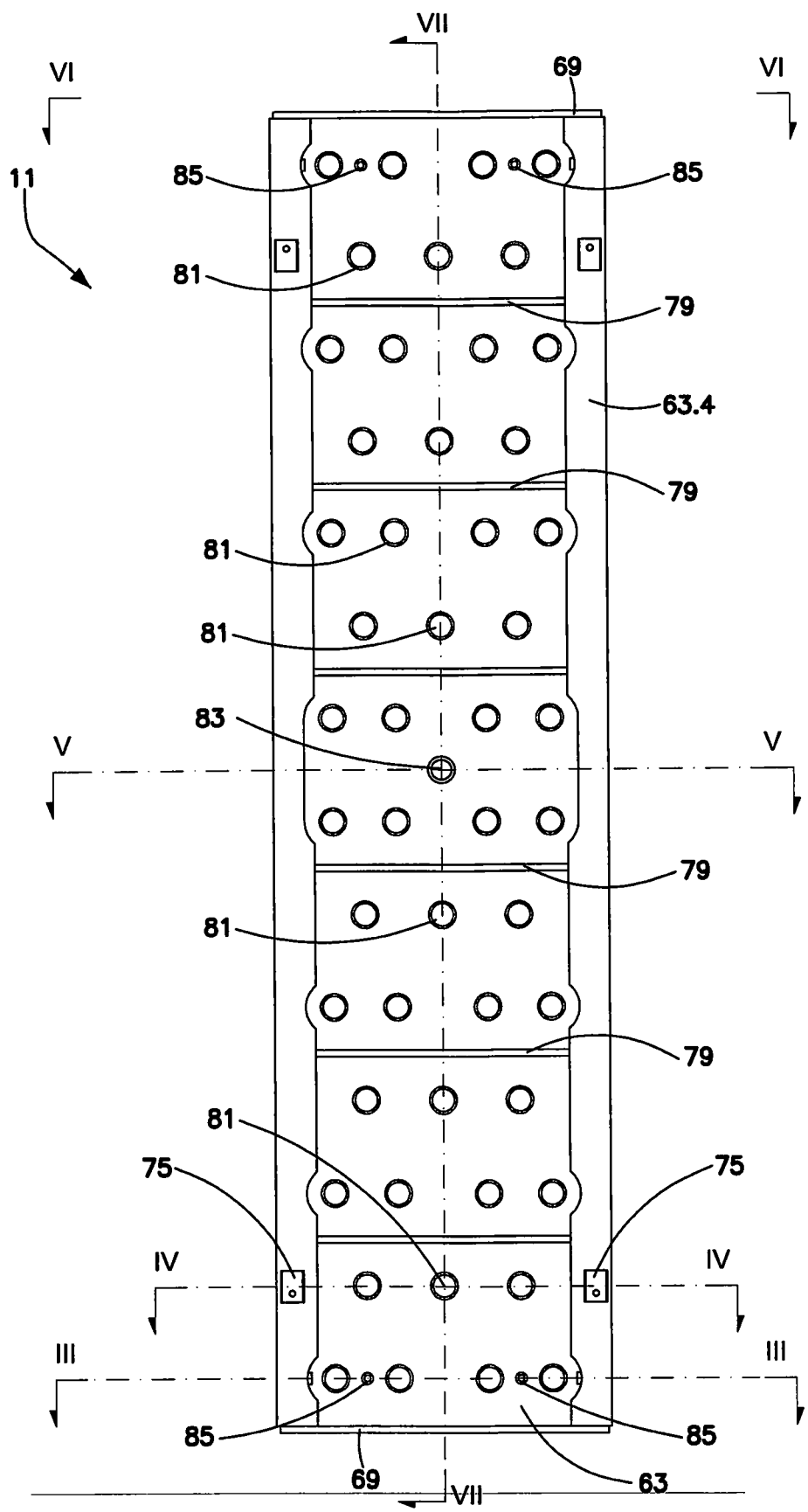
FIG. 2 a bottom view of a hot plate of the double facer of FIG. 1 in a first embodiment.
Figure 3:
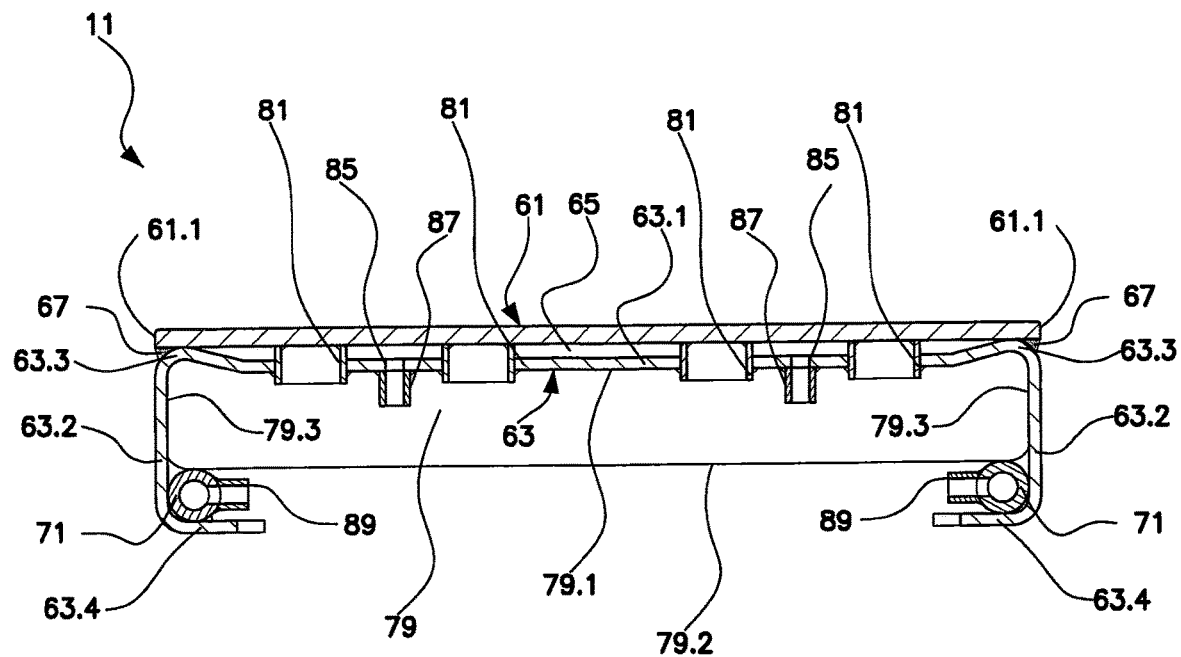
FIGS. 3, 4 and 5 cross sections according to lines III-III, IV-IV and V-V, respectively, of FIG. 2.
Figure 4:
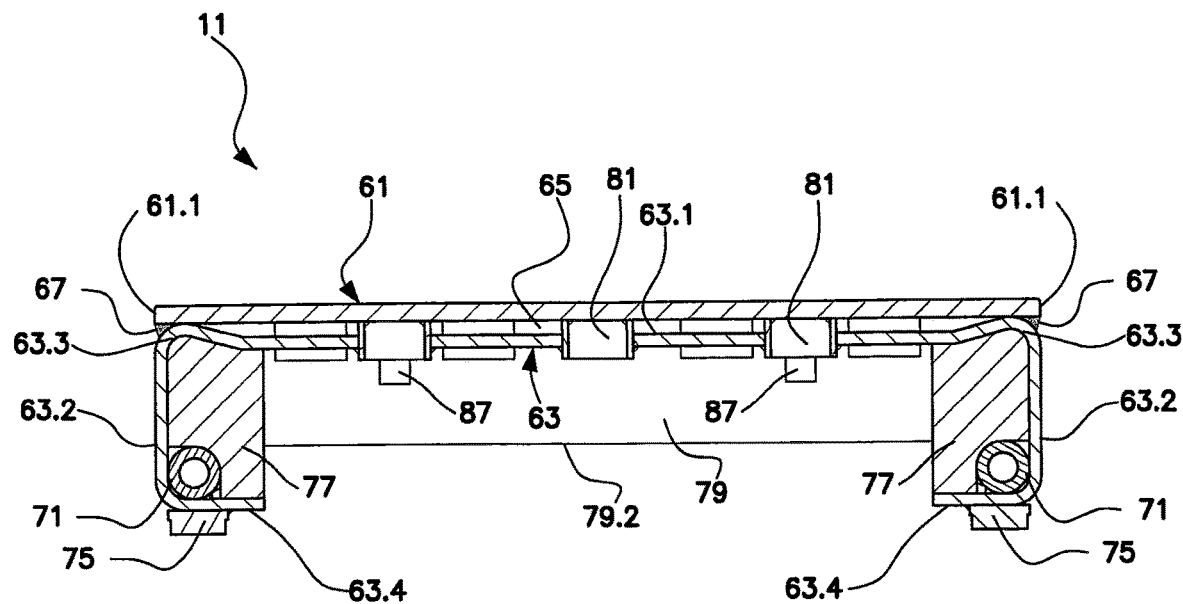
Figure 5:
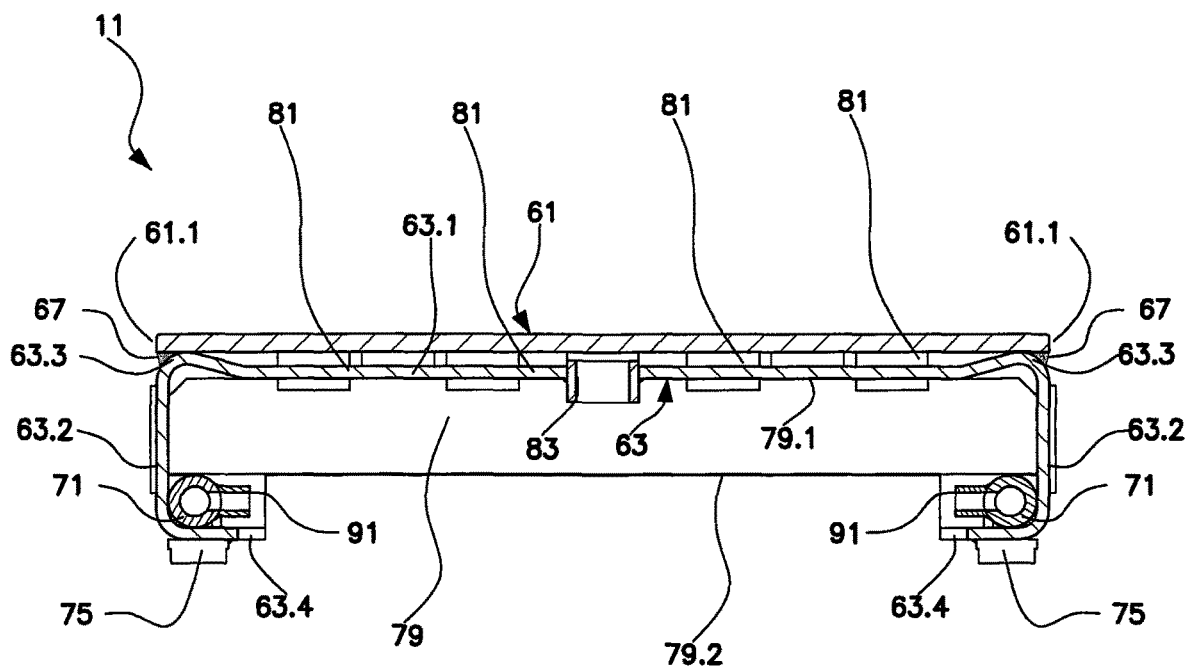
Figure 6:
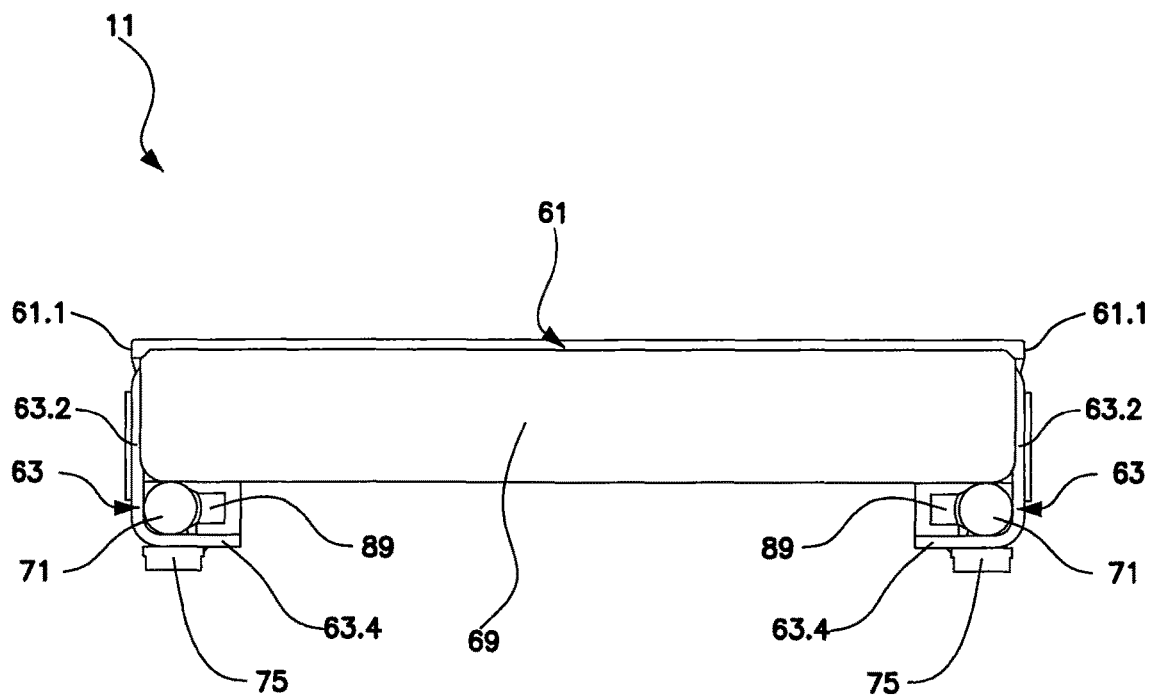
FIG. 6 a front view according to line VI-VI of FIG. 2.
Figure 11:
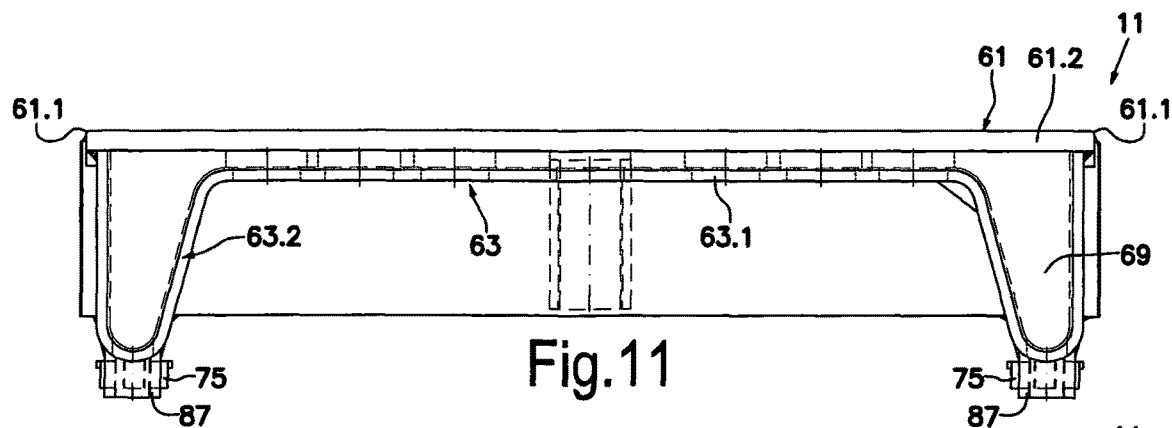
FIG. 11 a head view according to line XI-XI of FIG. 9.
Figure 12:
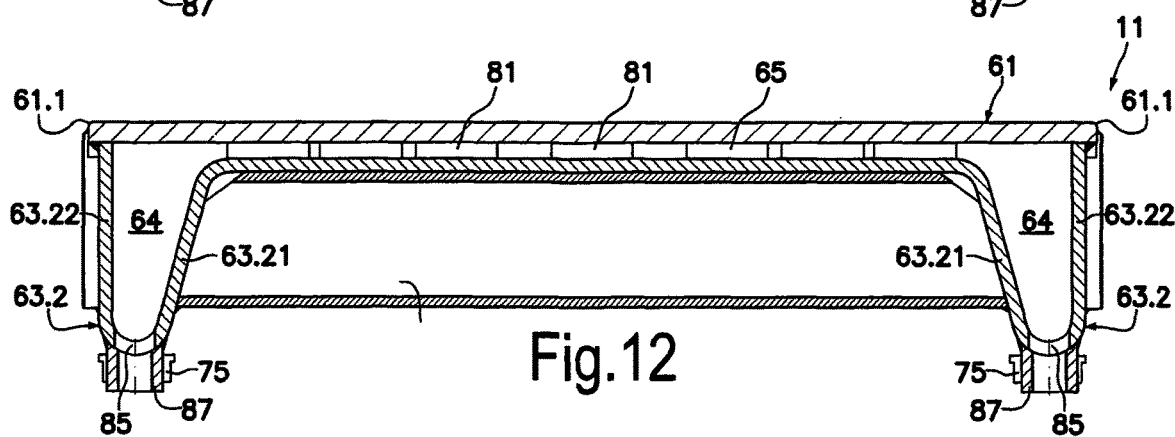
FIGS. 12 and 13 sections according to lines XII-XII and XIII-XIII of FIG. 9.
Figure 13:
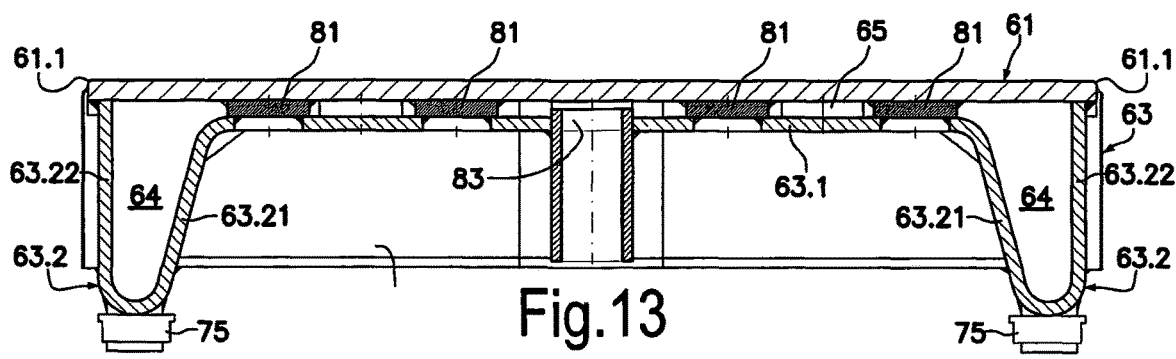

It should be understood that the double facer of FIG. 1 is by way of example only and that many of the components described below may be replaced with other components having similar functions or, in certain cases, even omitted. For example, the corrugated board traction systems, as well as the pressure systems with which the continuous corrugated board is pressed against the hot plates, may be substantially different from those illustrated by way of example only in FIG. 1 described below. In general, the hot plates, described in greater detail with reference to FIG. 2 and following, may be used in any double facer system that requires the use of hot plates on which the corrugated board is pressed and made to slide, irrespective of the corrugated board traction members and of the type of corrugated board pressure means or members, for example.

That said, in the exemplary embodiment of FIG. 1 the double facer section has an inlet 3 and an outlet 5. Reference F indicates the direction of advancement of the continuous corrugated board C through the double facer 1. The double facer comprises a heating section 7 and a cold traction section 9.

The heating section 7 comprises a plurality of hot plates 11 arranged in sequence along the feeding path of the corrugated board C. Each hot plate 11 is heated to a suitable temperature, for example by means of a heat transfer fluid. In some cases, the heat transfer fluid is steam.

In the illustrated embodiment, the traction section 9 comprises a lower flexible member 13, for example consisting of a suitably motorized continuous belt. Reference f13 indicates the direction of advancement of the lower flexible member 13. In some embodiments, the lower flexible member 13 is guided around rollers 15, 17, 19. One of these rollers is motorized. In the example shown, the motorized roller is roller 15. Reference numeral 16 schematically indicates a first electric motor for driving the roller 15 and therefore the lower flexible member 13. The upper branch of the lower flexible member 13 advances in contact with a support plate 21, which extends between the guide roller 17 and the motorized roller 15. Along the active branch of the lower flexible member 13, the inner surface thereof is in sliding contact with the support plate 21, while the outer surface of the lower flexible member 13 is in contact with the corrugated board C. By inner surface of a continuous flexible member it is meant the surface facing the inside of the closed path along which the flexible member moves, while the outer surface means the surface facing the outside of the closed path. In the illustrated example, the lower flexible member helps to pull the corrugated board C through the heating section 7 and the cold traction section 9. The friction between the corrugated board C and the lower flexible member 13 transmits a dragging force from the lower flexible member 13 to the corrugated board C.

As can be seen in FIG. 1, the lower flexible member 13 extends downstream of the heating section 7, and therefore downstream of the hot plates 11, to the outlet 5 of the double facer 1.

In the embodiment shown in FIG. 1, an upper flexible member 25 is also provided, which extends along the entire double facer, preferably from the inlet 3 to the outlet 5, and therefore both through the heating section 7 and through the cold traction section 9. Reference f25 indicates the direction of advancement of the upper flexible member 25 which, similarly to the lower flexible member 13, may consist of a continuous belt. The upper flexible member 25 is guided around a plurality of rollers, at least one of which is motorized. In the illustrated example, the lower flexible member 25 is guided around a motorized roller 27, located at the outlet 5. Reference numeral 28 schematically indicates a second electric motor, which drives the motorized roller 27 and advances the upper flexible member 25. Reference numeral 29 indicates a guide roller of the upper flexible member 25 located at the inlet 3 of the double facer 1. An active branch of the upper flexible member 25 extends between the rollers 29 and 27, parallel to the hot plates 11 and parallel to the support plate 21. The return branch of the upper flexible member 25 is guided around a series of guide rollers 31, 32, 33, 34, 35, 36, 37.

Along the active branch of the upper flexible member 25, the outer surface thereof is in contact with the upper surface of the corrugated board C, to transmit (by friction) a traction force. Along the same active branch, the inner surface of the upper flexible member 25 advances in contact with pressure members 41 carried by a stationary bearing structure 43, placed above the hot plates 11. The pressure members 41 are adapted to press the active branch of the upper flexible member 25 against the corrugated board C, so as to guarantee a sufficient friction force between the corrugated board C and the upper flexible member 25. Furthermore, the pressure of the pressure members 41 ensures the contact of the corrugated board C on the upper surface of the heating plates 11, so as to obtain a correct heating of the corrugated board C. The pressure and the heating cause the smooth and corrugated paper sheets, which form the corrugated board C, to glue together thanks to the adhesive applied on the flutes of the corrugated sheets before entering the double facer 1, in a per se known manner. The large mutual contact surface between corrugated board C, hot plates 11 and upper flexible member 25 ensures that the pressure is relatively low and in any case such as not to cause crushing of the corrugated board. The length of the hot plates 11 and the feeding speed are selected such as to guarantee a contact time between corrugated board C and hot plates 11 sufficient to obtain gluing.

In the cold traction section 9 the lower branch of the upper flexible member 25 is pressed against the corrugated board C and against the upper branch of the lower continuous flexible member 13, which slides on the stationary contrast surface. In this way, the corrugated board C is retained between the two active branches of the upper flexible member 25 and of the lower flexible member 13, and is effectively dragged forward according to arrow F to the outlet 5 of the double facer. The pressure of the upper flexible member 25 against the lower flexible member 13, against the corrugated board C and against the support plate 21 is ensured, for example, by pressure members 51 mounted on a support structure 53 in the cold traction section.

Although in the embodiment of FIG. 1 the corrugated board C is pulled by a pair of continuous, upper and lower flexible members, and the pressure members 41 act on the corrugated board indirectly, i.e. pressing against it the active branch of the upper flexible member 25, in other known embodiments of the double facer the pressure members may act directly on the corrugated board, which may be towed by different traction members, arranged for example all in the cold traction section only, and not in the heating section where the hot plates 11 are placed.

In some embodiments, the hot plates 11 may have the configuration described below with reference to FIGS. 2 to 8. In advantageous embodiments, all the hot plates 11 may have substantially the same shape, and preferably have the same dimensions, although this is not strictly necessary. Therefore, a single hot plate 11 will be described below.

The hot plate 11 comprises an upper plate 61 and a lower plate 63 joined together in the manner described below. The upper plate 61 is a substantially flat plate of substantially rectangular shape, with two longer sides 61.1 and two shorter sides 61.2. The longer sides 61.1 extend in a direction transverse to the direction of advancement F of the corrugated board C along the double facer 1 (FIG. 1).

The upper plate 61 and the lower plate 63 may be made of a suitable metal material, for example steel. The upper plate 61 may be advantageously thicker than the lower plate 63. For example, the lower plate 63 may have a thickness of between about 1 and about 2 cm, preferably between about 1 and about 1.5 cm, while the upper plate 61 may have a thickness about 1.5-2.5 times the thickness of the lower plate 63.

A steam circulating chamber 65 is delimited between the upper plate 61 and the lower plate 63. The height of the steam circulation chamber 65 is small, for example equal to or less than the thickness of the upper plate 61 and preferably comprised between the thickness of the upper plate 61 and the thickness of the lower plate 63.

The lower plate 63 is not flat as the upper plate 61, but is bent to form a substantially flat central area 63.1, below the upper plate 61 and two longitudinal edges 63.2, extending parallel to the longer sides 61.1 of the upper plate 61 and bent downwardly, orthogonally to the latter. The substantially flat central area 63.1 of the lower plate 63 is connected to the longitudinal edges 63.2 by two curved approximately cylindrical connecting portions 63.3.

In advantageous embodiments, the upper plate 61 and the lower plate 63 are joined together by two continuous welds 67 extending along the longer sides 61.1 of the upper plate and along the curved connecting portions 63.3 between the central zone 63.1 and the longitudinal edges 63.2 of the bottom plate 63. The welds 67 seal the steam circulation chamber 65 along the long sides.

The steam circulation chamber 65 may be closed frontally, i.e. along the shorter sides 61.2 of the upper plate 61, by means of end walls 69, for example welded to the transverse end edges of the plates 61 and 63.

Each longitudinal edge 63.2 has, at the free end opposite the respective curved portion 63.3, a bent longitudinal end edge 63.4. In the rounded corner formed by each longitudinal edge 63.2 in the connection area to the bent longitudinal edge 63.4 there is a duct 71 for collecting steam and/or condensate from the steam circulation chamber 65. The connection between the chamber 65 and the two ducts 71 will be described later. In the illustrated embodiment, the longitudinal edges 63.4 are bent by about 90° with respect to the portion adjacent thereto of the longitudinal edge 63.2, so that each duct 71 is surrounded by about 90° by the sheet forming the lower plate 63.

Support feet 75 are fixed on the outer, i.e. lower, surface, of the bent edges 63.4, to rest the hot plate 11 on an underlying support structure (see FIG. 1). Advantageously, four support feet 75 are provided in the illustrated embodiment. A reinforcing gusset 77 may be provided at each support foot 75 (see FIGS. 4 and 6, in particular). Each reinforcing gusset 77 extends from the bent edge 63.4 to the portion of the plate 63 below the upper plate 61.

Reinforcing or stiffening ribs 79 extend between the downwardly bent edges of the lower plate 63. In the embodiment shown (see FIGS. 2 and 6) six reinforcing or stiffening ribs 79 are provided substantially parallel and preferably equidistant to each other. Each reinforcing rib 79 may consist of a wall substantially orthogonal to the upper plate 61 and to the central zone 63.1, with an upper longitudinal edge 79.1 in contact with the outer surface of the lower plate 63 and with a lower longitudinal edge 79.2. The upper edge 79.1 may be shaped so as to adhere to the lower surface of the lower plate 63 over its entire extension, also at the curved portions 63.3. Advantageously, the upper edges 79.1 may be continuously or discontinuously welded to the lower surface of the lower plate 63.

Each reinforcing or stiffening rib 79 has end or head edges 79.3, orthogonal to the lower edge 79.2. The opposite end edges 79.3 of each stiffening rib 79 are joined, for example by welding, to the opposite downwardly bent edges 63.2 of the lower plate 63.

Advantageously, the height of each stiffening rib 79 is such that the lower longitudinal edge 79.2 is located above the ducts 71. In this way, the stiffening ribs 79 are not in direct thermal contact with the ducts 71, so that the lower edges of the ribs are not heated.

The upper plate 61 and the lower plate 63 are joined together not only along the longer sides 61.1 by means of the welds 67, but also by means of a plurality of tie-rods 81 distributed along the entire flat extension of the hot plate 11. Each tie-rod is welded to the upper plate 61 and to the lower plate 63, so as to form reciprocal anchoring points adapted to transmit a tensile force between the upper plate 61 and the lower plate 63, orthogonally to the extension of the upper plate 61 and therefore orthogonally to the feeding and sliding surface of the corrugated board C, defined by the upper, i.e. outer, surface of the upper plate 61.

In the illustrated embodiment, each tie-rod 81 has the shape of a tubular body, i.e. a bush shape. In the example shown, each tie-rod is welded to the inner, i.e. lower, surface of the upper plate 61 and passes through a corresponding through hole made in the lower plate 63. A weld made between the tubular body and the edge of the respective hole of the lower plate 63 anchors the tie-rod to the lower plate 63 and provides a sealed closure of the steam circulation chamber 65.

The entry of steam into the steam circulation chamber 65 may be through one or more inlet ports. In the illustrated embodiment, only one inlet port 83 is provided in a central position, formed by a bush welded in a through hole of the lower plate 63. The bush forming the inlet port 83 may be internally threaded to provide an attachment to a steam supply duct (not shown). In other embodiments, one or more steam inlet ports may be provided at different points, for example at the two ends of the chamber 65.

The exhausted steam and/or the condensate, which is formed due to transfer of heat from the steam to the corrugated board C through the upper plate 61, may be discharged from the steam circulation chamber 65 through one or more discharge ports. In the illustrated embodiment there are four discharge ports 85 formed in the lower plate 63; see in particular FIGS. 2, 3 and 7. Each discharge port 85 is associated with a discharge fitting 87 (see FIG. 3). Each discharge fitting 87 may be connected via a drain pipe, not shown, to a corresponding fitting 89 at one end of one of the two ducts 71, see in particular FIGS. 3, 7 and 8. Furthermore, each duct 79 has at least one discharge port for the condensate or the exhausted steam. In the embodiment, a single discharge port 91 is provided in the center of each duct 71 (see in particular FIGS. 5 and 7).

With this arrangement, the saturated or superheated and pressurized steam is fed through the central inlet port into the steam circulation chamber 65 of each hot plate 11. By forced convection and conduction, the heat transported by the steam is transferred to the corrugated board C which is pressed against the upper surface of the upper plate 61 and slides there along. Partially cooled and possibly totally or partly condensed steam flows through the discharge ports 85 into the ducts 71 and from these through the discharge ports 91 via return ducts (not shown) to a boiler or other heating and vaporization system.

The structure of the hot plate 11 is such as to obtain a low thermal inertia and a high structural rigidity, which avoids or substantially reduces the thermal deformations that could cause a non-planarity of the upper, i.e. outer, surface of the upper plate 61, on which the corrugated board C slides.

Advantageously, in addition to a structural stiffening the ribs 79 provide an effect of compensation for thermal expansion. In use, in fact, the thermal stresses tend to bend the upper plate 61. The reinforcing and stiffening ribs 79 have a temperature profile with maximum temperature values along the upper longitudinal edge 79.1 and minimum along the lower longitudinal edge 79.2. This temperature profile, and the consequent tendency to thermal deformation of the ribs 79 compensate for the thermal deformation of the upper plate 61, so that the shape of its upper surface on which the corrugated board C slides remains substantially planar, or in any case within acceptable planarity tolerances.

The steam flowing in the ducts 71 heats the ducts and the lower portion of the downwardly bent edges 63.2 of the lower plate 63. This heating causes a temperature profile which tends to compensate for thermal deformation which would otherwise tend to bend the upper plate 61.

FIGS. 9 to 13 show a further embodiment of a hot plate usable in the double facer described with reference to FIG. 1. Same numbers indicate parts equal or corresponding to those of the embodiment of FIGS. 2 to 8.

In the embodiment of FIGS. 9 to 13, the hot plate 11 comprises an upper plate 61 and a lower plate 63 joined together in the manner described below. The upper plate 61 is a substantially flat plate of substantially rectangular shape, with two longer sides 61.1 and two shorter sides 61.2. The longer sides 61.1 extend in a direction transverse to the direction of advancement F of the corrugated board C along the double facer 1 (FIG. 1).

The upper plate 61 and the lower plate 63 may be made of a suitable metal material, for example steel. The upper plate 61 may have a thickness advantageously greater than the lower plate 63. For example, the lower plate 63 may have a thickness of between about 1 and about 2 cm, preferably between about 1 and about 1.5 cm, while the upper plate 61 may have a thickness about 1.5-2.5 times the thickness of the lower plate 63.

A chamber 65 for circulating steam is delimited between the upper plate 61 and the lower plate 63. The height of the steam circulation chamber 65 is small, for example equal to or less than the thickness of the upper plate 61 and preferably comprised between the thickness of the upper plate 61 and the thickness of the lower plate 63.

The lower plate 63 is not as flat as the upper plate 61, but is bent to form a substantially flat central area 63.1, below the upper plate 61 and two longitudinal edges 63.2, extending parallel to the longer sides 61.1 of the upper plate 61 and protruding downwardly with respect to the upper plate 61, that is, on the side opposite to the outer surface of the upper plate 61, along which the corrugated board C slides.

More particularly, the lower plate 63 has longitudinal edges 63.2, parallel to the longer sides of the hot plate and downwardly bent, that is, on the side opposite to the upper plate 61. The downwardly bent edges 63.2 form two respective channels 64 with an approximately V-shaped cross section, as visible in particular in the cross sections of FIGS. 12 and 13. Each of the two V-channels 64 is delimited by the edges 63.2 of the bottom plate 63. More particularly, each downwardly bent edge 63.2 of the lower plate 63, is formed by two portions 63.21 and 63.22 which form the sides of the respective channel 64. The two sides 63.21 and 63.22 of the downwardly bent edge 63.2 of the lower plate 63 are connected to each other at the bottom, to form the bottom of the respective channel 64. The first side 63.21, closer to the median line of the hot plate 11, is formed by a portion of the edge of the lower plate 63 and extends from the substantially flat central portion 63.1 of the lower plate 63 downwards. The second side 63.22 is formed by a second edge portion of the lower plate 63, which extends again towards the upper plate 61.

The lower plate 63 and the upper plate 61 are joined together by welding along the longer sides 61.1 of the upper plate 61 and along the free edges of the downwardly bent edges of the lower plate 63, i.e. along the free edges of the portions 63.22 of each edge 63.2. More particularly, in advantageous embodiments, the upper plate 61 and the lower plate 63 are joined together by two continuous welds 67 extending along the longer sides 61.1 of the upper plate 61. The welds 67 seal the steam circulation chamber 65 along the long sides.

The steam circulation chamber 65 may be closed frontally, i.e. along the shorter sides 61.2 of the upper plate 61, by means of end walls 69, for example welded to the transverse end edges of the plates 61 and 63.

Support feet 75 are fixed on the outer, i.e. lower, surface of the edges 63.2, to rest the hot plate 11 on an underlying support structure (see FIG. 1). Advantageously, four support feet 75 are provided in the illustrated embodiment.

Reinforcing or stiffening ribs 79 extend between the downwardly bent edges of the lower plate 63. In the embodiment shown (FIGS. 9 and 10) eight reinforcing or stiffening ribs 79 are provided substantially parallel and preferably equidistant to each other. Each reinforcing rib 79 may consist of a wall substantially orthogonal to the upper plate 61 and to the central zone 63.1. In the illustrated embodiment, each reinforcing rib 79 is made of a portion of a beam with I or H cross section, with an upper wing integral with the outer surface of the lower plate 63 and a free lower wing. In other embodiments, ribs of another shape may be used, for example of the type illustrated in FIGS. 2 to 8. Advantageously, the upper edges or wings may be continuously or discontinuously welded to the lower surface of the lower plate 63.

Each reinforcing or stiffening rib 79 has end or head edges which may be joined, for example by welding, to the opposite downwardly bent edges 63.2 of the lower plate 63.

In this way, the stiffening ribs 79 are in direct thermal contact with the channels 64 through the sides 63.21.

The upper plate 61 and the lower plate 63 are joined together, not only along the longer sides 61.1 by means of the welds 67, but also by means of a plurality of tie-rods 81 distributed along the entire flat extension of the hot plate 11. Each tie-rod is welded to the upper plate 61 and to the lower plate 63, so as to constitute reciprocal anchoring points adapted to transmit a tensile force between the upper plate 61 and the lower plate 63, orthogonally to the extension of the upper plate 61 and therefore orthogonally to the feeding and sliding surface of the corrugated board C, defined by the upper, i.e. outer surface of the upper plate 61.

In the illustrated embodiment, each tie-rod 81 has the shape of a disc body. In the example shown, each tie-rod is welded to the inner, i.e. lower, surface of the upper plate 61 at a through hole made in the lower plate 63. A weld made between the tie-rod and the respective hole of the lower plate 63 anchors the tie-rod to the lower plate 63 and provides a sealed closure of the steam circulation chamber 65.

The entry of steam into the steam circulation chamber 65 may be obtained through one or more inlet ports. In the illustrated embodiment, only one inlet port 83 is provided in a central position, formed by a bush welded in a through hole of the lower plate 63. The bush forming the inlet port 83 may be internally threaded to provide an attachment to a steam supply duct (not shown).

The exhausted steam and/or the condensate, which is formed by the effect of the transfer of heat from the steam to the corrugated board C through the upper plate 61, may be discharged from the steam circulation chamber 65 through one or more discharge ports. In the illustrated embodiment, four discharge ports 85 are provided (FIG. 12) formed in the bottom of the two channels 64 formed by the downwardly bent edges 63.2 of the lower plate 63. Each discharge port 85 is associated with a discharge fitting 87 (see FIGS. 9, 10, 11, 12). Each discharge fitting 87 may be connected to a discharge pipe, not shown.

With this arrangement, the saturated or superheated and pressurized steam is fed through the central inlet port 83 into the steam circulation chamber 65 of each hot plate 11. By forced convection and conduction, the heat transported by the steam is transferred to the corrugated board C which slides pressed against the upper surface of the upper plate 61. Partially cooled and possibly entirely or partly condensed steam flows through the channels 64 and the discharge ports 85 into the discharge fittings 87. From here the condensate and/or cooled steam flows to a boiler or other heating and vaporization system.

Also in this embodiment, the structure of the hot plate 11 is such as to obtain a low thermal inertia and a high structural rigidity, which avoids or substantially reduces the thermal deformations that could cause a non-planarity of the upper, i.e. outer, surface of the upper plate 61, on which the corrugated board C slides.

Advantageously, as in the embodiment of FIGS. 2 to 8, the ribs 79 provide, in addition to a structural stiffening, an effect of compensation for thermal expansion. In use, in fact, the thermal stresses tend to bend the upper plate 61. The reinforcing and stiffening ribs 79 have a temperature profile with maximum temperature values along the upper longitudinal edge and minimum along the lower longitudinal edge. This temperature profile, and the consequent tendency to thermal deformation of the ribs 79 compensate for the thermal deformation of the upper plate 61, so that the shape of the upper surface thereof, on which the corrugated board C slides, remains substantially planar, or in any case within acceptable planarity tolerances.

The steam flowing into the channels 64 heats the channels and the downwardly bent edges 63.2 of the lower plate 63. This heating causes a temperature profile, which tends to compensate for thermal deformation which would otherwise tend to bend the upper plate 61.

In general, it has been found that the described structure allows obtaining an optimal behavior of the hot plate and a substantial maintenance of the planarity of the sliding surface of the corrugated board. In fact, when the double facer is in operation, the corrugated board C which slides on the upper surface of the hot plates removes heat and consequently the average temperature of the upper plate (in contact with the corrugated board) of the hot plate will be lower than the temperature of the lower plate. The heating circuit comprising the ducts 71 or the channels 64 is at a lower temperature than the steam circulation chamber 65. Furthermore, the reinforcing or stiffening ribs 79 are also at a lower temperature. This temperature balance causes the upper surface of the hot plate 11, on which the corrugated board C slides, to remain substantially flat in operating conditions.

What is claimed is:

1. A hot plate for a double facer of a corrugated board production line, comprising an upper plate joined to a lower plate; wherein a heat transfer fluid circulation chamber is defined between the upper plate and the lower plate, with at least a first inlet of the heat transfer fluid and at least a first outlet of the heat transfer fluid; wherein the upper plate has a rectangular extension; wherein the upper plate is joined to the lower plate along two parallel sides of the upper plate; wherein the lower plate has, along said two sides, two downwardly bent edges; wherein a plurality of stiffening ribs are joined to the lower plate, along the heat transfer fluid circulation chamber, each stiffening rib having a first end joined to a first one of said downwardly bent edges of the lower plate and a second end joined to a second one of the downwardly bent edges of the lower plate.

2. The hot plate of claim 1, wherein the upper plate and the lower plate are joined together at intermediate points within the rectangular extension of the upper plate by mutual anchoring tie-rods, adapted to provide a tensile force approximately orthogonal to the upper plate and to the lower plate.

3. The hot plate of claim 2, wherein each of said tie-rods comprises a tubular body and wherein each of said tie-rods is welded to an inner surface of the upper plate and to an outer surface of the lower plate.

4. The hot plate of claim 2, wherein each of said tie-rods is welded to an inner surface of the upper plate and in a hole of the lower plate.

5. The hot plate of claim 1, wherein each of said downwardly bent edges of the lower plate is associated with a respective heating duct and is in heat exchange relationship therewith; and wherein each of the respective heating ducts is substantially parallel to the sides of the upper plate along which the upper plate is joined to the lower plate.

6. The hot plate of claim 5, wherein each of the respective heating ducts is in thermal contact with a respective longitudinal end edge of a respective one of the downwardly bent edges of the lower plate; wherein each of the respective longitudinal edges is curved to at least partially envelop the heating duct.

7. The hot plate of claim 5, wherein each of the respective heating ducts is in fluid connection with the heat transfer fluid circulation chamber defined between the upper plate and the lower plate.

8. The hot plate of claim 7, wherein each of the respective heating ducts is adapted to receive exhausted heat transfer fluid from the heat transfer fluid circulation chamber and to discharge said exhausted heat transfer fluid from the respective heating duct.

9. The hot plate of claim 8, comprising four outlets of the heat transfer fluid from the heat transfer fluid circulation chamber defined between the upper plate and the lower plate; wherein two of said four outlets are in fluid connection with a first of said respective heating ducts and another two of said four outlets are in fluid connection with a second of said respective heating ducts.

10. The hot plate of claim 1, wherein each of the downwardly bent edges of the lower plate forms a channel for collecting exhausted heat transfer fluid from the heat transfer fluid circulation chamber.

11. The hot plate of claim 10, wherein the channel has at least one discharge port for the exhausted heat transfer fluid.

12. The hot plate of claim 1, wherein the at least first inlet of the heat transfer fluid is placed in a central position of the hot plate and comprises an opening made in the lower plate.

13. The hot plate of claim 1, wherein the lower plate comprises a flat portion parallel to the upper plate and two curved portions, parallel to the parallel sides of the upper plate along which the upper plate is joined to the lower plate, said curved portions forming convex surfaces with a cylindrical extension, along which continuous welds are made for joining the lower plate to the upper plate.

14. The hot plate of claim 1, wherein the upper plate has a greater thickness than the lower plate.

15. The hot plate of claim 1, wherein the stiffening ribs are rigidly connected by welding along a longitudinal edge thereof to an outer surface of the lower plate approximately parallel to the upper plate; and along two opposite end edges thereof to the downwardly bent edges of the lower plate.

16. The hot plate of claim 1, wherein the downwardly bent edges of the lower plate are substantially orthogonal to the upper plate.

17. The hot plate of claim 1, wherein the upper plate and the lower plate are joined together along said parallel sides of the upper plate by continuous welding beads.

18. The hot plate of claim 1, wherein the downwardly bent edges of the lower plate are integral with supporting feet of the hot plate for resting the hot plate on a support structure.

19. A double facer for producing corrugated board comprising: a heating section comprising a series of hot plates arranged in sequence along a feeding path of a continuous strip of corrugated board; and traction members for towing the corrugated board sliding along the hot plates; wherein each hot plate comprises an upper plate joined to a lower plate; wherein a heat transfer fluid circulation chamber is defined between the upper plate and the lower plate, with at least a first inlet for a heat transfer fluid and at least a first outlet of the heat transfer fluid; wherein the upper plate has a rectangular extension; wherein the upper plate is joined to the lower plate along two parallel sides of the upper plate; wherein the lower plate has, along said two parallel sides, two downwardly bent edges; wherein a plurality of stiffening ribs are joined to the lower plate, along the heat transfer fluid circulation chamber, each stiffening rib having a first end joined to a first one of said downwardly bent edges of the lower plate and a second end joined to a second one of the downwardly bent edges of the lower plate.

* * * * *